Patented July 31, 1951

2,562,198

UNITED STATES PATENT OFFICE 2,562,198

N-BETA-PROPIONIC ACID DERIVATIVES OF ALPHA-AMINO ACIDS

Leonard L. McKinney, Eugene H. Uhing, Eugene A. Setzkorn, and John C. Cowan, Peoria, Ill., assignors to the United States of America as represented by the Secretary of Agriculture No Drawing. Application October 28, 1949, Serial No. 124,251

12 Claims. (Cl. 260—519)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to a new class of chemical compounds, the N-beta-propionic acid derivatives of alpha-amino acids, and to methods for the preparation of these compounds. The products of this invention have the following general structural formula:

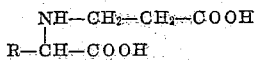

in which R denotes the residual group of the alpha-amino acids in any of their optical isomeric or their racemic forms.

The new compounds are white crystalline solids, useful in the production of synthetic resins, artificial fibers, plastics, plasticizers, pharmaceuticals, insecticides and other products.

These compounds are produced by either acid or by alkaline hydrolysis of beta cyanoethyl derivatives described in the patent application Ser. No. 84,257, filed March 29, 1949, by McKinney, Cowan and Uhing, now Patent No. 2,838,024. In accordance with said patent application, beta cyanoethyl derivatives of amino acids are produced having the following general structural formulae:

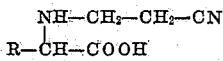

and

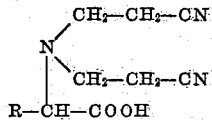

In accordance with the disclosure of said patent application, these cyanoethyl compounds are produced by the reaction of acrylonitrile with amino acid salts such as the alkali metal salts, alkaline earth metal salts, ammonium salts or quaternary ammonium salts. The reaction may be carried out at atmospheric pressures and room temperatures or lower, up to the reflux temperature of the reaction mixture. It may also be carried out employing superatmospheric pressures and correspondingly higher temperatures. The reaction occurs so readily that one molecular equivalent of acrylonitrile reacts to produce the monocyanoethyl derivatives in nearly quantitative yield. The dicyanoethyl derivatives are obtained by employing two or more molecular equivalents of acrylonitrile. The reaction is preferably carried out in an aqueous medium, although the process can be successfully carried out by merely bringing the two reactants into chemical contact as by refluxing the acrylonitrile with the salt of the amino acid.

In either of the structural formulae given above R may represent an aliphatic, araliphatic, or an aromatic group. It may also be heterocyclic as for example in the derivatives of tryptophane and histidine. The amino acids used in the process of the said application may be naturally occurring or synthetically produced alpha-amino acids. Moreover, the acids may be in any of their optical isomeric forms or in racemic mixtures. The acids used may be in isolated and purified form, or may comprise mixtures of the acids with small amounts of impurities or even mixtures of unisolated amino acids, such as for example, protein hydrolysates.

In accordance with our invention we have discovered that the nitrile group of these mono- and di-cyanoethyl derivatives of alpha-amino acids described in said application are readily hydrolyzed to the novel class of compounds represented by the general structural formula appearing first above. The hydrolysis may be carried out in aqueous solutions by mineral acids, such as hydrochloric or sulfuric acid, or by alkalis, such as sodium hydroxide or barium hydroxide. The hydrolysis appears to be progressive, and its progress may be followed conveniently by methods which will readily occur to those skilled in the art, one of which will be particularized below. The hydrolysis reaction may be carried out by heating with the acid or the alkali in aqueous solution, and is usually complete within a period of from 30 minutes to 20 hours. The time of hydrolysis will vary with the conditions employed, as for example, the concentration and amount of hydrolytic agent and the temperature and pressure of heating. For reasons of convenience we prefer to heat the reaction mixtures to boiling or refluxing temperatures at atmospheric pressure. However, the reaction may be carried out at increased or decreased pressures.

When the hydrolysis is carried out with acids, ammonium salts of the acids are formed, as for example hydrolysis with hydrochloric acid gives ammonium chloride. In such cases the progress of the hydrolysis reaction is readily followed by adding magnesium oxide to an aliquot and boiling off ammonia. The liberated ammonia is measured by the standard Kjeldahl technique and the amino nitrogen of the derivative is not affected. When alkaline hydrolysis is employed, ammonia is liberated during the hydrolysis and the reaction may be followed by measuring the residual nitrogen of an aliquot taken from the reaction mixture.

Alkaline hydrolysis is preferred because of the shorter time required to convert the nitrile group to a carboxyl group and because of the slightly higher yields obtained as a result of less side reactions.

The hydrolysis reaction may be carried out on dicyanoethylated protein hydrolysates or a fraction of the hydrolysate, such as is obtained as a by-product in monosodium glutamate manufacture. Such byproduct cakes as are made up of insoluble amino acids such as a tyrosineleucine cake are colored primarily because their insolubility precludes decolorizing with charcoal. However, the N-beta propionic acid derivatives are sufficiently soluble in water for decolorizing with charcoal and the mixture may be obtained as a white crystalline material.

The compounds of this invention contain an active hydrogen on the amino group and may be acylated with an acylating agent such as, for example, acetic anhydride, to produce the corresponding acyl derivative. Acylation converts the compound from an amine to one possessing the functional characteristics of the amide, thereby changing its properties accordingly and rendering it useful in applications where amines are less suitable.

The following examples are illustrative of the invention.

*Example 1*

$N$ - (carboxymethyl) - $\beta$ - alanine.—This compound was prepared both by acid and alkaline hydrolysis of monocyanoethyl-glycine as designated in the following tabulation. The table also summarizes the results of these experiments:

| Acid or base used | | | Hours boiled | Product | | |
|---|---|---|---|---|---|---|
| | | | | N analysis | | Yield, per cent |
| Comp. used | Equivalents | Normality | | Found | Calculated | |
| HCl | 10.2 | 6.0 | 18 | [1] 7.64 | 7.64 | 52 |
| H₂SO₄ | 6.0 | 9.03 | 20 | 9.39 | 9.52 | 60 |
| Ba(OH)₂ | 2.5 | 2.08 | 4 | 9.43 | 9.52 | 74 |

[1] Isolated as the hydrochloride.

As indicated in the table the nitrile group was hydrolyzed more readily with alkali than with acid. In each experiment the reaction was followed by removing aliquots at intervals and was not stopped until nitrogen analysis indicated complete reaction. When hydrochloric acid was used, the ammonium chloride was removed by fractional crystallization from water-acetone. The hydrochloride of the product melted at 120–122° C. With sulfuric acid, barium hydroxide was added and the barium sulfate was removed by centrifuging, the product, N-(carboxymethyl)-β-alanine crystallized from aqueous solution. When barium hydroxide was used, the barium was removed by adding sulfuric acid to pH 3.0. The product crystallized readily from water as the dihydrate. The dihydrate was unstable and slowly liberated two molecules of water under atmospheric conditions. The solubility of the anhydrous compound per 100 ml. of water was: 2.6 g. at 7° C.; 5.6 g. at room temperature; infinite in hot water. The compound appeared to exist as a dipolar ion or Zwitterion, and melted with decomposition at 191°–192° C.

It formed the monobarium salt with barium carbonate. Analyses and properties of the compound agreed with the following formula:

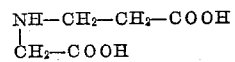

*Example 2*

$N$ - ($\beta$ - propionic acid)-alanine.—One - fourth mole (48.4 g.) of dicyanoethylalanine was dissolved in 200 ml. of water. One-fourth mole of barium hydroxide octahydrate, suspended in 400 ml. of water, was added to the above solution and the mixture boiled for 2½ hours. An additional ⅛ mole of barium hydroxide was then added and the boiling continued for three more hours at which time analysis indicated complete hydrolysis. Sulfuric acid (⅜ mole) was added (pH was 2.6) and BaSO₄ was removed by centrifugation. The clear solution was evaporated to 375 ml. and 700 ml. of acetone was added. The product crystallized in long needles. M. P.=200°–202° C. dec. N analysis: found 8.50; calc'd for the monopropionic acid derivative 8.68. The formula of the product was:

NH—CH₂—CH₂—COOH
|
CH₃—CH—COOH

*Example 3*

$N$ - ($\beta$ - propionic acid)-valine.—One sixteenth mole (10.64 g.) of monocyanoethyl-DL-valine was thoroughly mixed with 2.4 equivalents of Ba(OH)₂.8H₂O and melted on steam bath. The molten mixture was stirred for 20 minutes whereupon it solidified. The solid was dissolved in water and sulfuric acid added. Barium sulfate was removed by filtering and the filtrate was evaporated to dryness to yield a white powder which could be crystallized from hot water. Yield 72.7%. M. P. 233°–235° C. dec. N analysis: found 7.38; calc'd 7.40, agreeing with the formula:

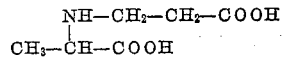

*Example 4*

$N$ - ($\beta$ - propionic acid) - leucine.—Monocyanoethyl -L-leucine (10.7 g.) was suspended in 200 ml. of water. Barium hydroxide octahydrate (2.5 equivalents) was dissolved in 250 ml. of water and added to the above suspension. The mixture was boiled for 3½ hours and sulfuric acid (3.95 ml.) added. The hot mixture was centrifuged to remove BaSO₄ and the filtrate was evaporated under reduced pressure to incipient crystallization. Crystals formed upon cooling and contained 6.95% nitrogen. (Calc'd 6.89.) Upon recrystallization from hot water, nitrogen content was 6.81%. Yield 61%. M. P. 230°–225° C. dec. Analyses agreed with the formula:

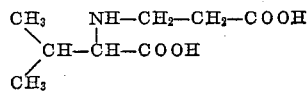

*Example 5*

$N$-($\beta$-propionic acid)-methionine.—This compound was obtained on alkaline hydrolysis of both the mono- and di-cyanoethylmethionine:

Monocyanoethyl - DL - methionine (¼ mole) was suspended in 300 ml. of water and 2.5 equivalents of Ba(OH)₂.8H₂O, in 300 ml. of water was added. The mixture was boiled for 3 hours at which time a white precipitate was present and analysis indicated completion of hydrolysis. The precipitate was removed by centrifuging, washed and dried. N analysis: found 3.83; calc'd for the barium salt 3.93. Yield 90%. Sulfuric acid was added and the BaSO₄ removed. The filtrate was evaporated to 400 ml. and allowed to stand overnight at 4° C. and 30.6 g. of crystals were filtered off. An additional 6 g. was obtained by evaporating the filtrate. Total yield 86%. Upon recrystallization from hot water M. P. was 212°–215° C. dec. N analysis: found 6.36; calc'd 6.33.

Di-cyanoethyl-DL-methionine (¼ mole) was mixed with Ba(OH)₂.2H₂O (⅜ mole) and 500 ml. of water added. The mixture was boiled 4 hours and ⅜ mole of sulfuric acid was added. The volume was made up to 1500 ml. and BaSO₄ removed by centrifuging while hot. Upon cooling 31 g. of crystals were obtained. M. P. 216°–218° C. N analysis: found 6.29; calc'd for the mono-propionic acid derivative of methionine 6.33. Yield 56%.

In both cases analysis indicated the following formula:

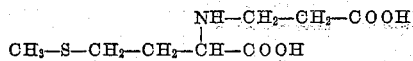

Example 6

N - (β - propionic acid) -tyrosine.—Monocyanoethyl-L-tyrosine was hydrolyzed with both acid and base by methods similar to those of Example 1. The results are summarized in the following table:

| Acid or Base Used | | | Hours boiled | N analysis | | Yield, Percent |
|---|---|---|---|---|---|---|
| Comp. used | Equivalents | Normality | | Found | Calc'd | |
| NaOH | 7 | 3.5 | 7 | 5.48 | 5.53 | 74.5 |
| Ba(OH)₂ | 3 | 3 | 6 | 5.36 | 5.53 | 77 |
| HCl | 8 | 6 | 24 | 5.50 | 5.53 | 90.8 |

The product was readily isolated because it precipitated upon adjusting the pH to 3.5 and the salt could be removed by washing. Solubility in water was 0.08 g. per 100 ml. at room temperature. M. P. 255°–256° C. dec. The product was very soluble in hot phenol. Analysis agreed with the following formula:

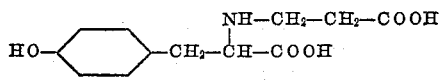

Example 7

N-(β-propionic acid)-aspartic acid.—Monocyanoethyl-DL-aspartic acid (¼ mole) was suspended in 200 ml. of water and sodium hydroxide (¾ mole), dissolved in 200 ml. of water, was added. After boiling 6 hours, analysis indicated that the reaction had gone to completion. Hydrochloric acid (¾ mole) was added and the solution evaporated to 200 ml. volume. After standing at 5° C. overnight the crystals were filtered off and washed free of chlorides with cold water. Yield was 31 g. (60%). After recrystallizing from hot water 6.82% nitrogen was found (calc'd 6.82). M. P. 202°–203° C. dec. Properties and analyses agreed with the following formula:

NH—CH₂—CH₂—COOH
|
CH—COOH
|
CH₂—COOH

Example 8

Crude mixture of amino acids.—The crude "cake" obtained as a byproduct of monosodium glutamate manufacture and containing principally leucine, isoleucine and methionine was dissolved in water containing sodium hydroxide equivalent to the Kjeldahl nitrogen content. One equivalent of acrylonitrile, based on nitrogen content, was added. The mixture was allowed to stand at room temperature for 2 days after which it was heated to boiling to complete the cyanoethylation reaction. Additional sodium hydroxide (1.1 equivalent) was added and the mixture was boiled for 4 hours. The sodium hydroxide was neutralized with hydrochloric acid whereupon a precipitate formed. The precipitate was filtered off and washed with cold water. Additional product was recovered by evaporating the filtrate and washings. Yield 89% based on nitrogen content of the original "cake." The original "cake" was light brown in color and the final product was also light brown in color. Twenty grams of the colored product was dissolved in 200 ml. of hot water and treated with powdered charcoal. Upon cooling white crystals were obtained with a nitrogen content of 6.77% (calc'd for the leucine derivative 6.89; for the methionine derivative 6.33).

Example 9

N-(β-propionic acid)-acetyl methionine.—Five g. (.0226 mole) of the product obtained from the alkaline hydrolysis of monocyanoethyl-DL-methionine (N 6.36, M. P. 212°–215° C. dec.) was dissolved in 100 ml. of hot water. To the warm solution 50 ml. (.5 mole) of acetic anhydride was added in two equal portions while stirring. After standing .5 hour the solution was evaporated on a steam bath under reduced pressure. Fifty ml. of dioxane was added and evaporated off to facilitate removal of the acetic acid present. Twenty ml. of water was added. A small amount of precipitate (.7 g.) formed and was removed by filtration. To the filtrate 10 ml. of acetone was added and the solution placed at 4° C. for 3 hours. The precipitate formed was filtered and dried. Product weighed 3.5 g. and contained 5.16% nitrogen. Upon recrystallization from hot water the product gave following analysis; M. P. 146°–148° C. Neutral equivalent (132.3×2) =264.6 and 5.28% nitrogen. Calc'd neutral equivalent 264.25 and 5.29% nitrogen agreeing with the formula:

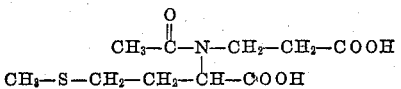

We claim:
1. N-(beta-propionic acid)-tyrosine of the following formula

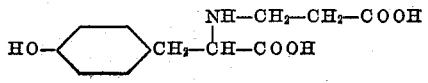

2. N-(beta-propionic acid)-leucine of the following formula:

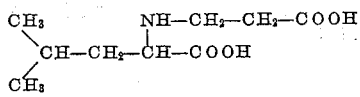

3. N-(beta-propionic acid)-methionine of the following formula:

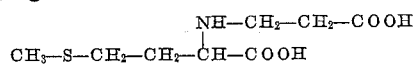

4. N-(beta-propionic acid)-valine of the following formula:

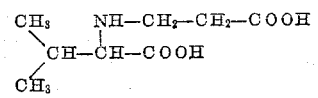

5. The process which comprises heating an aqueous reaction mixture comprising monocyanoethyl-L-tyrosine and a hydrolyzing agent of the group consisting of acids and alkalis until hydrolysis of the nitrile group is substantially complete.

6. The process which comprises heating an aqueous reaction mixture comprising monocyanoethyl-L-leucine and barium hydroxide until hydrolysis of the nitrile group is substantially complete and recovering the resulting N-(beta-propionic acid)-leucine.

7. The process which comprises heating an aqueous reaction mixture comprising the crude mixture of cyanoethyl-L-leucine, cyanoethyl-L-isoleucine, and cyanoethyl-L-methionine and sodium hydroxide until hydrolysis of the nitrile groups is substantially complete.

8. The process which comprises heating an aqueous reaction mixture comprising cyanoethyl methionine and an alkali until hydrolysis of the nitrile group is substantially complete and recovering the resulting N-(beta-propionic acid)-methionine.

9. A compound of the group consisting of N-beta propionic acid-tyrosine, N-beta propionic acid-leucine, N-beta propionic acid-methionine, N-beta propionic acid-valine, and N-beta propionic acid-aspartic acid.

10. N-(β-propionic acid)-aspartic acid of the formula:

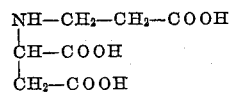

11. The process of preparing N-beta-propionic acid derivatives of alpha-amino acids which comprises hydrolyzing in aqueous solution a compound of the group consisting of cyanoethyl-tyrosine, cyanoethyl-leucine, cyanoethyl-methionine, cyanoethyl-valine, and cyanoethyl-aspartic acid, by heating with a hydrolyzing agent of the group consisting of acids and alkalis until hydrolysis of the nitrile group is substantially complete.

12. The process of claim 11 in which the hydrolyzing agent is an alkali.

LEONARD L. McKINNEY.
EUGENE H. UHING.
EUGENE A. SETZKORN.
JOHN C. COWAN.

REFERENCES CITED

The following references are of record in the file of this patent:

UNITED STATES PATENTS

| Number | Name | Date |
| --- | --- | --- |
| 1,992,615 | Hoffman et al. | Feb. 26, 1935 |
| 2,195,974 | Reppe et al. | Apr. 2, 1940 |
| 2,200,220 | Reppe et al. | May 7, 1940 |

OTHER REFERENCES

Ghosh et al., Chem. Abstracts, vol. 24, page 4787 (1930).

Abderhalden et al., Chem. Abstracts, vol. 26, page 696 (1932).

Karrer et al., Chem. Abstracts, vol. 37, col. 6649 (1943).

Stadnikow, Beilstein (Handbuch, 4th ed.) vol. 14, page 472 (1931).

Sugasawa, Beilstein (Handbuch, 4th ed., 2nd sup.) vol. 4, page 909 (1942).

Stadnikow, Ber. Deut. Chem., vol. 44, pp. 43-51 (1911).